Oct. 23, 1962          J. MORKOSKI ET AL                3,059,706
                      IMPLEMENT LIFT MEANS
Filed April 11, 1960                              2 Sheets-Sheet 1
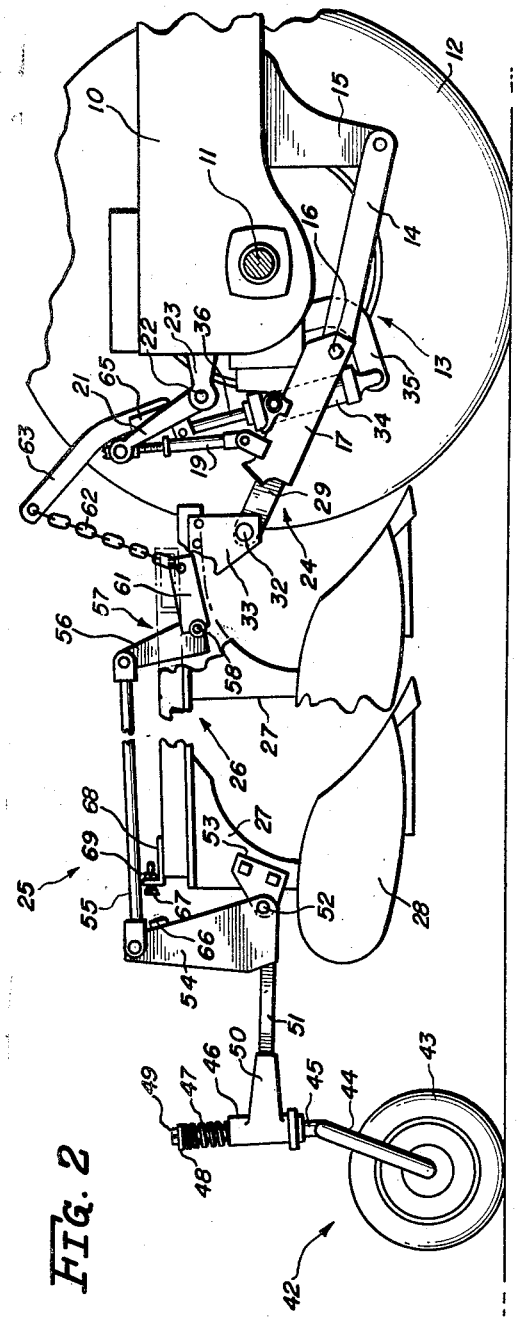
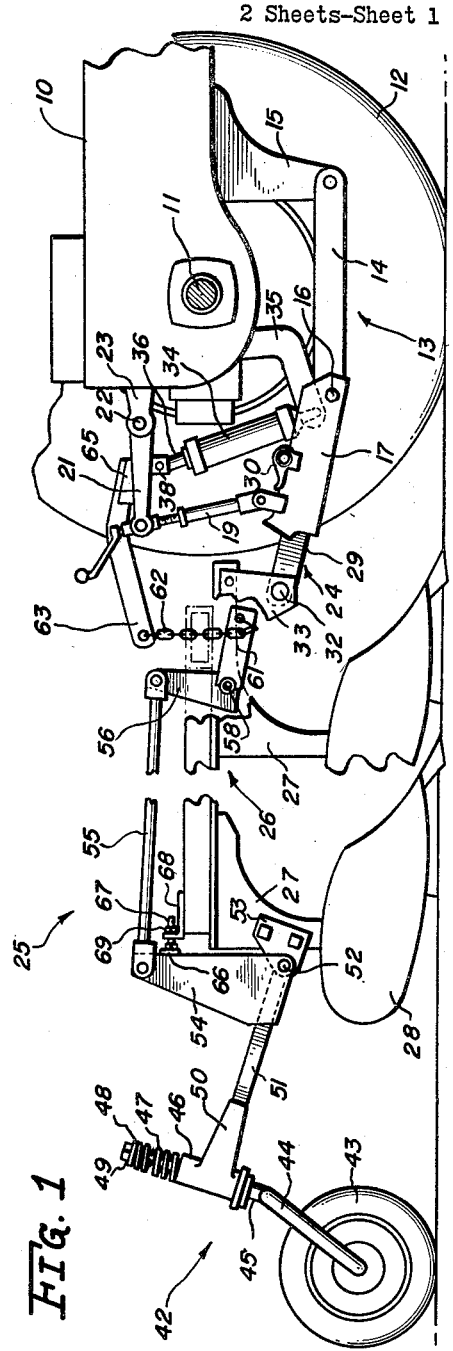
INVENTORS
James Morkoski
Eldon A. Harden
Paul O. Pippel
Atty.

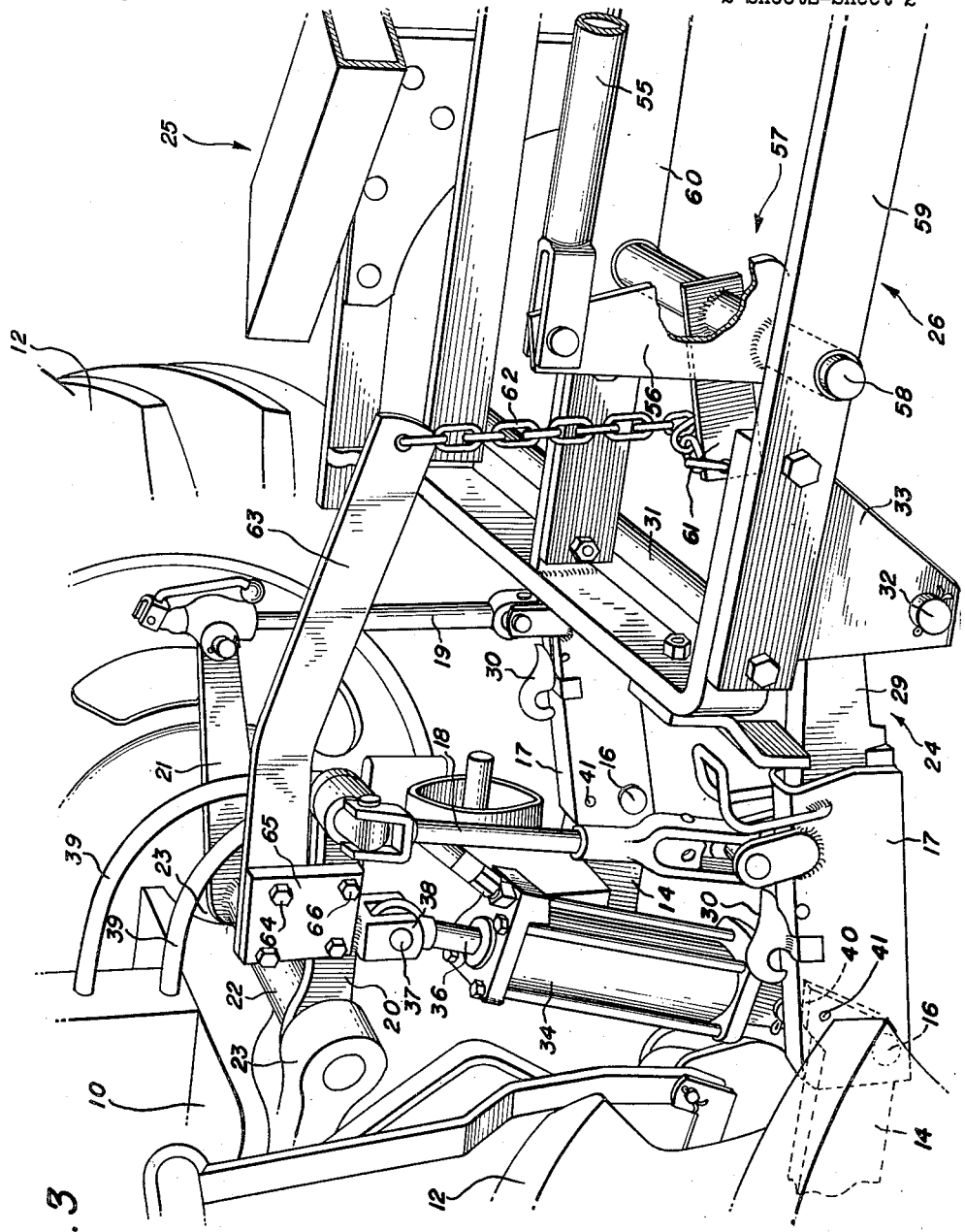

United States Patent Office 3,059,706
Patented Oct. 23, 1962

3,059,706
IMPLEMENT LIFT MEANS
James Morkoski, Clarendon Hills, and Eldon A. Harden, Naperville, Ill., assignors to International Harvester Company, Chicago, Ill., a corporation of New Jersey
Filed Apr. 11, 1960, Ser. No. 21,386
6 Claims. (Cl. 172—445)

This invention relates to agricultural implements and particularly to plows. More specifically, the invention concerns a plow of the semi-mounted type wherein the rear end of the plow frame is supported by a furrow wheel.

In a plow of this type, which is frequently very large and heavy, the movement of the frame relative to the rear supporting wheel from an operating to a transport position requires a great deal of power, and an object of this invention is to provide novel means for vertically moving the frame relative to the rear supporting wheel of a multi-bottom, semi-mounted plow or the like relative to the tool supporting frame to raise the latter to a transport position when the front end of the plow is raised.

Another object of the invention is the provision, in a semi-mounted tractor propelled plow or the like, of novel means for transmitting power to the rear furrow wheel of the plow to raise the rear end of the frame after a predetermined lifting of the front end of the frame to facilitate withdrawal of the earth-working tool from the ground.

Another object of the invention is the provision, in an implement of the semi-tractor mounted type wherein a wheel supports the rear end of the implement frame, of novel means utilizing some of the weight of the front end of the implement during lifting thereof to transmit power to the rear wheel to raise the rear end of the frame.

Other objects and advantages of the invention will become clear from the following detailed description when read in conjunction with the accompanying drawings, wherein:

FIGURE 1 is a view in side elevation of a tractor and implement combination embodying the features of this invention, only the rear end of the tractor being shown, and with one wheel removed, and the implement attaching structure of the tractor being shown in operating position of the implement;

FIGURE 2 is a view similar to FIGURE 1 showing the implement in transport positions; and FIGURE 3 is an enlarged detail in perspective of the draft, or implement attaching structure of the tractor and the connection thereof to the front end of the plow frame.

Referring to the drawings, the numeral 10 designates the body of a tractor having a transverse rear axle 11 and laterally spaced drive wheels 12.

The tractor is provided with a draft structure of a well known type comprising a draft member 13 including laterally spaced rearwardly extending arms 14 pivotally connected at their forward ends to a bracket 15 secured to the tractor body and depending therefrom. To the rear end of each of the arms 14 is pivotally connected at 16 an elongated socket member 17 pivotally connected by lift links 18 and 19 with laterally spaced lift arms 20 and 21, respectively, affixed to a shaft 22 rockably mounted in bearings 23 affixed to the tractor body.

The draft structure 13 of the tractor is connected to the hitch structure 24 of an implement in the form of a multi-bottom moldboard plow 25 comprising a frame 26 to which are secured a plurality of diagonally arranged plow standards 27, each of which carries at its lower end a plow bottom 28. Although only two plow bottoms are shown, it may be understood that more earth-working tool units in the form of plow standards 27 and plow bottoms 28 may be mounted on the plow frame between the front and rear plow units shown in the drawings.

The implement hitch structure 24 comprises a pair of laterally spaced shaft members 29 adapted to be slidably received in the respective socket members 17 to form an integral association therewith. The forward ends of shafts 29 are releasably held against longitudinal displacement in socket 17 by means of latches 30. The shafts 29 are connected by a cross brace 31 and the rear ends of the shafts are affixed to a shaft member 32 pivotally supported in one or more brackets 33 affixed to and depending from the plow frame 26.

At this point it should be clear that vertical swinging of lift arms 20 and 21, acting through lift links 18 and 19, will raise and lower the draft structure 13 of the tractor, the implement hitch 24, and the front end of the implement frame. Raising and lowering of the lift arms 20 and 21 on the tractor is accomplished through power operating means in the form of a hydraulic cylinder 34 pivotally anchored at its lower end to a bracket 35 secured to and depending from the rear end of the tractor on one side thereof. A piston rod 36 slidable in the cylinder is pivotally connected at 37 to a clevis 38 affixed to lift arm 20 medially of its end. Thus, extension and retraction of rod 36 in cylinder 34 vertically swings lift arms 20 and 21 to raise and to lower the draft structure 13 of the tractor and the front end of the implement. Fluid under pressure is supplied to the cylinder 34 through hose lines 39 from a source on the tractor.

It may be noted that the rear end of each arm 14 of the draft structure 13, to which the sockets 17 are pivoted at 16, is provided with an upwardly projecting shoulder 40 engageable with the inside upper edge of socket 17 and is provided with an opening adapted to register with suitable openings 41 in the socket member whereby socket 17 may optionally be secured rigidly to the arm 14 by insertion of a pin or the like in said openings. In normal operation with an implement of the type described, sockets 17 are free to pivot with respect to the arms 14, and this articulation of the draft structure parts permits lifting of the implement to a greater height than would be possible if the draft structure were rigid.

When the implement is to be raised out of the ground it is preferable that the front end of the tool supporting frame be angled upwardly to facilitate withdrawal of the plow bottoms 28 from the ground. However, it is likewise necessary for transport purposes that the rear end of the rather elongated tool carrying frame 26 be elevated above the ground as indicated in FIGURE 2. The rear end of the frame is therefore supported by a rear furrow wheel assembly 42 comprising a furrow wheel 43 carried at the lower end of an axle 44 having a generally vertically extending spindle portion 45 rotatably receivable in a bearing 46 to accommodate castering of the wheel 43, and surrounded at its upper end by a spring 47 engageable with the bearing 46 and a collar 48 held in place by a nut 49 on the threaded upper end of the spindle 45.

A pair of laterally spaced plates 50 have secured therebetween the rear end of a bar 51, the forward end of which is pivotally mounted on a pin 52 carried by a bracket 53 secured to the rearmost tool standard 27.

An upwardly extending plate 54 is affixed to bar 51 and has a portion thereof apertured to rotatably receive the pin 52. Plate 54 serves as a rock arm which may be swung forwardly and rearwardly to vertically move the rear end of the plow frame relative to the furrow wheel unit between operating and transport positions.

The upper end of plate 54 is pivotally connected to the rear end of a rod 55, the forward end of which is pivotally connected to the upper end of a first arm 56 of a rockable motion transmitting member in the form of a bellcrank 57 fulcrumed on the plow frame rearwardly of the front end thereof by the provision of a shaft 58 rotatable in openings provided in bars 59 and 60 of the frame to which the arm 56 is affixed, as by welding.

The other arm 61 of the bellcrank is also welded to the shaft 58 and is connected by a flexible member in the form of a chain 62 to the rear end of an extension arm 63, the forward end of which is secured by bolts 64 to a plate 65 which is, in turn, affixed by bolts 66 to lift arm 20 medially of its ends. Extension arm 63 thus swings vertically with lift arms 20 and 21 and, having a much longer lever arm, the chain 62 connected thereto rises and falls at a greater rate of speed than the lift link 18 connected to the draft structure. The slack in the chain accommodates floating of the implement in the normal operation thereof.

This length of extension arm 63 and the disposition of bellcrank 57 considerably to the rear of the front end of the tool supporting frame is essential to the transmission of power to the rear furrow wheel 43 to raise the rear end of the frame when the piston rod 36 is extended in cylinder 34. As is clear from the drawings, slack is introduced into the chain 62 when the implement is in its operating position, and upon upward swinging of the lift arms 20 and 21 the front end of the implement is raised until slack is taken out of chain 62 and the weight of the front end of the tool frame is then effective to accommodate rocking of bellcrank 57 from the position shown in FIGURE 1 to the position shown in FIGURE 2 to elevate the rear end of the tool frame by forcing the wheel 43 downwardly relative thereto.

To adjustably limit the upward swinging of the furrow wheel unit 42 relative to the plow frame, an abutment member 66 secured to the forward edge of arm 54, is engageable with a threaded bolt 67 adjustably received in a bracket 68 mounted on the tool frame and provided with a lock nut 69.

While the invention herein has been described in its preferred embodiment, it should be understood that modifications may be made therein without departing from the spirit of the invention or the scope of the appended claims.

What is claimed is:

1. The combination with a tractor having power operated means thereon, lift arms pivoted on the tractor and actuated by the power operated means and a draft structure connected to the lift arms to be raised and lowered thereby, of a plow comprising an elongated tool frame having its forward end connected to said draft structure to be vertically moved therewith between operating and transport positions, a supporting wheel mounted on the rear end of the tool frame for vertical movement of the rear end of the tool frame relative to the supporting wheel between operating and transport positions of the tool frame, separate connecting means between said lift arms and said rear wheel adapted to transmit some of the weight of the front end of the frame to said rear wheel to vertically move the rear end of the frame relative to said rear wheel, comprising an extension arm pivoted on the tractor on a longer lever arm than said lift arms, whereby the end thereof moves about its pivot at a faster rate than the lift arms, motion transmitting means movably mounted on the plow frame and connected to said rear wheel to vertically move the rear end of the tool frame relative thereto in response to moving said motion transmitting means, and flexible means connecting said extension arm to said motion transmitting means.

2. The combination with a tractor having power operated means thereon, lift arms pivoted on the tractor and actuated by the power operated means and a draft structure connected to the lift arms to be raised and lowered thereby, of a plow comprising an elongated tool frame having its forward end connected to said draft structure to be vertically moved therewith between operating and transport positions, a supporting wheel mounted on the rear end of the tool frame for vertical movement of the rear end of the tool frame relative to the supporting wheel between operating and transport positions of the tool frame, separate connecting means between said lift arms and said rear wheel adapted to transmit some of the weight of the front end of the frame to said rear wheel to vertically move the rear end of the frame relative to said rear wheel, comprising an extension arm pivoted on the tractor on a longer lever arm than said lift arms, whereby the end thereof moves about its pivot at a faster rate than the lift arms, motion transmitting means, movably mounted on the plow frame and connected to said rear wheel to vertically move the rear end of the tool frame relative thereto in response to moving said motion transmitting means, and flexible means connecting said extension arm to said motion transmitting means, said flexible means being ineffective during the first part of the lifting movement of said lift arms to actuate said motion transmitting means.

3. The invention set forth in claim 1, wherein said motion transmitting means is a bellcrank fulcrumed on the tool frame having a first arm operatively connected to the rear wheel and a second arm connected to said extension arm.

4. The combination with a tractor having power operated means thereon, a lift arm pivotally mounted on the tractor and swingable generally vertically by said power operated means and a draft structure connected to the lift arm to be raised and lowered by the swinging thereof, of a plow comprising an elongated tool frame having its forward end connected to said draft structure to be vertically moved therewith between operating and transport positions, a supporting wheel mounted on the rear end of the tool frame for vertical movement of the rear end of the tool frame relative to the supporting wheel to raise and lower the rear end of the frame, a rearward extension on said lift arm vertically swingable therewith and at a faster rate due to its longer lever arm, a rockable member mounted on the tool frame, thrust means operatively connecting said rockable member to said wheel for vertically moving the rear end of the frame relative thereto to raise and lower the latter, and connecting means between said extension arm and said rockable member for rocking the latter.

5. The invention set forth in claim 4, wherein said connecting means is a chain having slack therein during part of the lifting movement of said lift arm and is ineffective to rock said rockable member.

6. The combination with a tractor having power operated means thereon, a lift arm mounted on the tractor and actuated by the power operated means and a draft structure connected to the lift arm to be raised and lowered thereby, of a plow comprising an elongated tool frame having its forward end connected to said draft structure to be vertically moved therewith between operating and transport positions, a supporting wheel mounted on the rear end of the tool frame for vertical movement of the rear end of the tool frame relative to the supporting wheel between operating and transport positions of the tool frame, separate connecting means between said lift arm and said rear wheel adapted to transmit some of the weight of the front end of the frame to said rear wheel to vertically move the rear end of the frame relative to said rear wheel, comprising another arm mounted on the tractor on a longer lever arm than said lift arm, whereby the end thereof moves at a faster rate than said lift arm, and motion transmitting means operatively connecting said other arm to said rear wheel to vertically move the rear end of the tool frame relative thereto in response to the movement of said other arm.

References Cited in the file of this patent

UNITED STATES PATENTS

| | | |
|---|---|---|
| 2,372,459 | Todd | Mar. 27, 1945 |
| 2,660,940 | Baughman | Dec. 1, 1953 |
| 2,673,505 | Altgelt | Mar. 30, 1954 |
| 2,678,596 | Todd | May 18, 1954 |
| 2,682,822 | Toland et al. | July 6, 1954 |
| 2,704,496 | Taylor | Mar. 22, 1955 |
| 2,968,356 | Mydels | Jan. 17, 1961 |

FOREIGN PATENTS

| | | |
|---|---|---|
| 472,392 | Italy | June 16, 1952 |